Damon & Whitaker.
Loom Shuttle.
Nº 79,556. Patented Jul. 7, 1868.
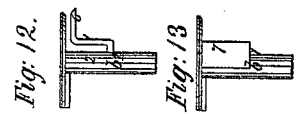
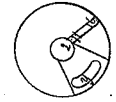  
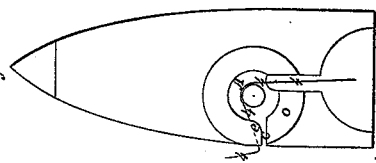 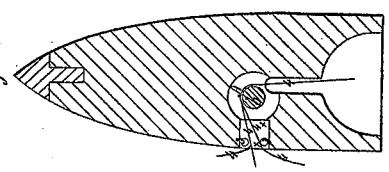 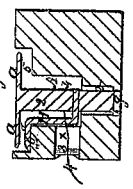
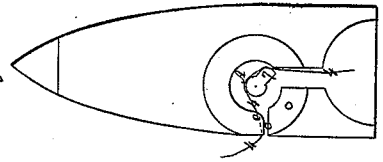 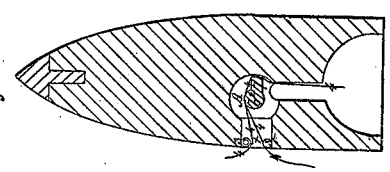 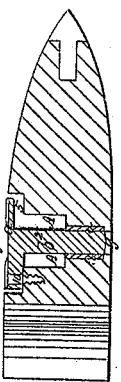
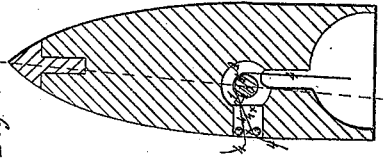
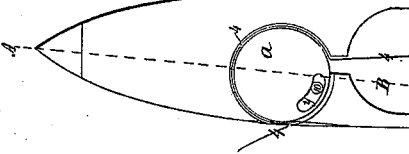
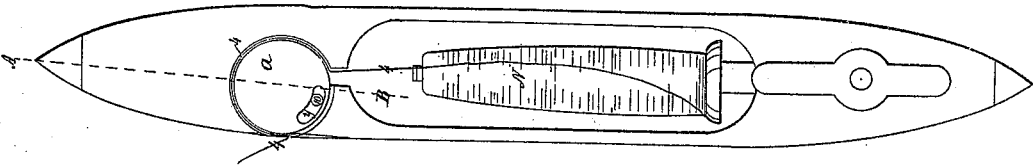
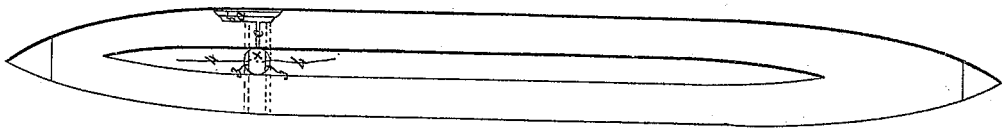
Witnesses: John E. Crane, Lang Monroe
Inventors: Alex. M. Damon, James Whitaker

United States Patent Office.

ALEXANDER M. DAMON AND JAMES WHITAKER, OF LOWELL, MASSACHUSETTS, ASSIGNORS TO EATON & AYER, OF NASHUA, NEW HAMPSHIRE.

Letters Patent No. 79,556, dated July 7, 1868.

IMPROVEMENT IN SHUTTLES.

The Schedule referred to in these Letters Patent and making part of the same.

TO ALL WHOM IT MAY CONCERN:

Be it known that we, ALEXANDER M. DAMON and JAMES WHITAKER, both of Lowell, in the county of Middlesex, and State of Massachusetts, have invented certain new and useful Improvements in Shuttles for Looms, of which the following is a full, clear, and exact description that will enable those skilled in the art to make and use our invention, reference being had to the accompanying drawings, making part of this specification, in which—

Figure 1 represents a front side elevation of a loom-shuttle having our improvements applied thereto.

Figure 2 represents a plan or top view of a loom-shuttle, as improved by us, and as it appears when ready for use; the red line 4 indicating the direction of the filling-thread from the bobbin, around and underneath the plate $a$, and to the slot $c$ and the eye of the shuttle.

Figures 3, 4, and 5 represent each the top side of that end of a shuttle where our improvements are applied after the plate $a$ has been removed; and each of such figures show the peculiar construction of that part of the shuttle whereby our improvements are applied and made operative.

Figures 6, 7, and 8 are horizontal plane sections longitudinally with and near the centre of the shuttle.

Figures 9, 10, and 11 represent a bottom view of different form of stud, $b$, which we employ for regulating or controlling the friction or tension on the filling, as it is drawn off from the bobbin, each stud being secured to the under side of a plate, $a$, or formed in one therewith.

Figure 12 is a side elevation of the forked stud shown in fig. 9.

Figure 13 is a side elevation of the wing-stud shown in fig. 10.

Figure 14 is a side elevation of the concentric stud shown in fig. 11.

Figure 15 represents a longitudinal sectional elevation of that end of the shuttle to which our improvements are applied, and on the line A B of fig. 2.

Figure 16 represents a sectional elevation on the line M N of fig. 3.

This invention is intended as an improvement on our former invention and improvement in slotted-eyed shuttles, and has for its object to render such shuttles capable of a wider and more useful range of action, and of greater utility, to greatly improve the means of removal and replacement of the plate supporting studs $b$, $b^1$, and $b^2$, and their respective plates $a$, and the means of adjustment of the said parts, without raising or lowering the same.

And this invention consists, first, of a forked stud, $b^2$, which is clearly shown in figs. 3, 6, 9, 12, and 16, of the drawings. This forked stud is combined with a plate, $a$, and when applied to the shuttle this plate is arranged over and serves as a cover for the slot, as in our former invention.

The second part of this invention consists in the slotted curved plate $a$, when used in a combination with the screw 10, and the forked stud, and with the bushing, $v$, constructed and applied to the shuttle, as shown and described, for the purpose of allowing the plate $a$ to be turned, to adjust the stud to alter or regulate the tension on the filling, without raising or lowering the plate, as in our former invention.

The top of the shuttle, around the cavity, is countersunk or counter-bored from one-eighth to one-fourth of an inch in depth, to receive the plate $a$, but is enough larger than said plate to allow the filling-thread to pass readily downward between the plate and the surrounding substance, and under the edge of the plate, which is raised, leaving a space, 5, for the filling, and also for the projecting arm 6 of the forked stud $b^2$, which guides the filling-thread between the two parts 1 and 2 of the said device, where any desired amount of tension or friction may be produced on the filling, by loosening the screw 10, and by turning the plate $a$ and the stud $b^2$, moving the arm 6 towards the slot $c$, when, as will be seen by red line 4, in figs. 3 and 6, the filling, 4, drawn between the two parts of the forked stud, and binding against both of such forked portions, can be tightened to any desired degree; and by turning the plate $a$ in the opposite direction, a greater or less part of a revolution, the tension on the filling may be lessened or regulated as desired. When the shuttle is used in a loom in which more than one kind of cloth is woven, requiring, at different times, considerable change in the tension on the filling, such changes are made by adjusting the forked stud, and it is, for this purpose, fully operative and reliable. When the changes in the tension on the filling are only slight, or requiring no great variation, the plate $a$ and the forked stud may be removed, and the eccentric or wing-stud $b^1$, and its plate $a$, supply the place of the forked stud and plate $a$ connected; and by moving the plate $a$ and the stud $b^1$ in the same manner as the forked stud and its plate were moved, the wing portion 7 swings round, and slightly changes the tension on the filling 4, as shown in figs. 4 and 7, where the wing 7 is shown in different positions in each figure.

When the tension on the filling is required to be the same at all times, the concentric stud $b$ is used, and this device supplies the place of either of the others, all as in our former invention.

In all three cases above described, and in the use of such studs and plates, the plate $a$ covers the slot $c$, and protects it from the action of the warp-threads, which would otherwise get into the slot and do great injury.

When the filling passes out at the eye of the shuttle, it is drawn first in one direction, then in the other direction, and it is quite important that both sides of the eye should be uniform, even, and smooth. This uniformity and smoothness is obtained or provided for by inserting a round metal guide-pin, 3, in the substance of the shuttle, at each side of the eye, and partly within and crossing it, as shown in the drawings. These guide-pins not only make both sides of the eye even and uniform, but they materially strengthen the side of the shuttle at each side of the slot $c$.

The bushing, $v$, inserted in the bottom of the cavity A, provides for the easy and convenient removal and replacing of studs $b$, and prevents the wood being worn or injured by such removing of studs. A hole, $g$, is made through the wood, beneath the bushing, into which a small punch may be inserted to remove a stud.

Securing the plate $a$ to the shuttle, and retaining it firmly and permanently in position by means of the bushed step and by the screw 10, which gets a good bearing and support in the solid substance of the shuttle, we find of great importance, since the plate and either of the studs must be firmly secured, in order to resist the violent action of the shuttle when it strikes the pickers at the extremities of the lay.

The slot $c$, unprotected by a plate, or an equivalent, would not be available and operative, but when covered by a plate, $a$, as clearly shown and described, it serves admirably the purpose of a thread-passage from the under side of the plate $a$ to the eye of the shuttle; and to insure the passage of the filling-thread to the slot $c$, the corner $e$, at one side of the slot, is rounded, and the thread 4, which, in threading the shuttle, passes round the plate $a$, as is seen in fig. 2, and beneath said plate, thence inward to the stud $b$, $b^1$, or $b^2$, and in the latter, over the outer end of the arm 6, and in either, over and around the rounded corner $e$, and into and through the slot $c$, to the eye $x$ of the shuttle, which completes the threading operation.

One great object of this invention is to prevent the necessity of sucking the filling through the eye of the shuttle, (at present a common practice,) and thereby inhaling dust and linty fibre, so injurious to the person threading the shuttle.

Other objects are, to provide ample means for regulating the tension of the filling, and devices which are easily adjustable or removable; devices which are substantial, reliable, and operative, and which are secured to the shuttle by means which cannot fail to insure their successful operation; devices which cover the slot $c$, and insure the safest action of the shuttle.

What we claim as new, and desire to secure by Letters Patent, is—

1. The forked stud, constructed substantially as described, and combined with a plate, $a$, and applied to the slotted-eyed shuttle for the purpose set forth.

2. The slotted curved plate $a$, in combination with the screw 10, the forked stud, the bushing $v$, and the shuttle, for the purpose and substantially as described.

ALEX. M. DAMON,
JAMES WHITAKER.

Witnesses:
JOHN E. CRANE,
LANG MONROE.